April 21, 1959 C. B. EMERY 2,882,723
SPRING TESTING APPARATUS
Filed Feb. 25, 1954

INVENTOR:
C. B. EMERY
BY
C. B. Hamilton
ATT'Y

United States Patent Office 2,882,723
Patented Apr. 21, 1959

2,882,723

SPRING TESTING APPARATUS

Charles B. Emery, Rogers, Ark., assignor to Western Electric Company, Incorporated, New York, N.Y., a corporation of New York Application February 25, 1954, Serial No. 412,413

6 Claims. (Cl. 73—161)

This invention relates to spring testing apparatus, and more particularly to apparatus for measuring the strength of springs of wire spring relays.

An object of the invention is to provide new and improved apparatus for measuring tension of springs.

Another object of the invention is to provide apparatus for measuring the strength of wire springs of wire spring relays.

A further object of the invention is to provide apparatus for sequentially measuring the tension of each wire spring contact of a wire spring relay comb.

An apparatus illustrating certain features of the invention may include a holder for sequentially moving a wire spring relay comb to present wire spring relay contacts sequentially into pressing engagement with a leaf spring shutter to vary the position of the shutter relative to a nozzle of a pneumatic gage which indicates the tension of each of the springs.

Figure 1:
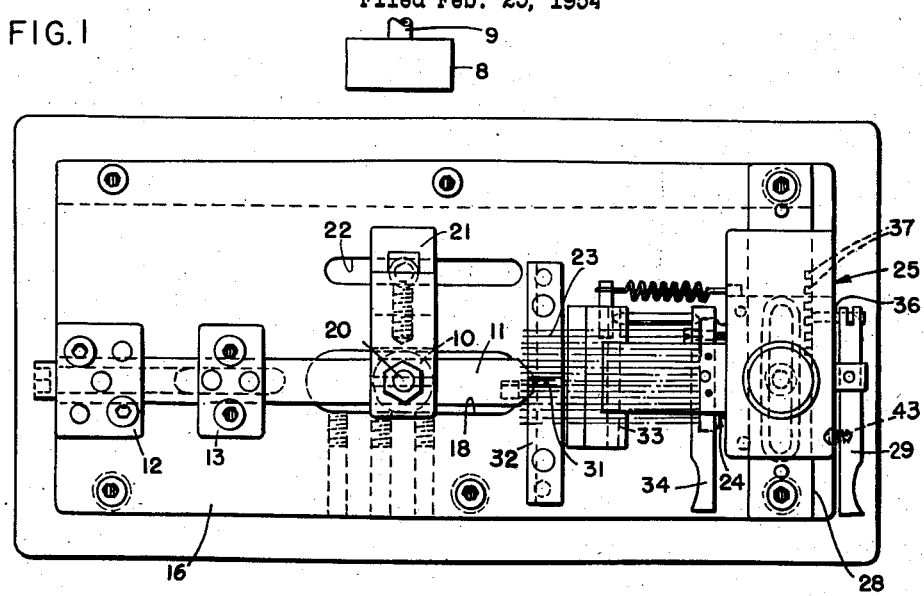
Figure 2:
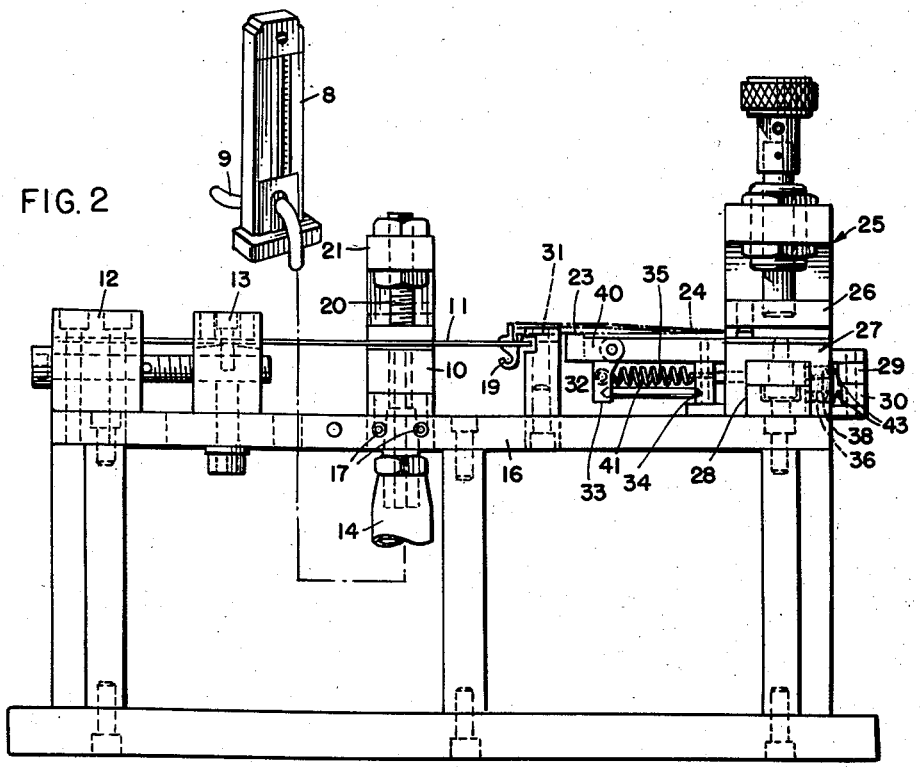

A complete understanding of the invention may be obtained from the following detailed description of an apparatus forming a specific embodiment thereof, when read in conjunction with the appended drawings, in which Fig. 1 is a top plan view of an apparatus forming one embodiment of the invention, and Fig. 2 is a front elevation of the apparatus shown in Fig. 1.

Referring now in detail to the drawings, there is shown therein a pneumatic gage 8 of a well known type supplied with air from a constant pressure supply carrier (not shown) through a hose 9. A nozzle 10, over which a leaf spring 11 is held in cantilever arrangement by adjustable clamps 12 and 13, is connected by a hose to the gage 8. Movement of the clamp 13 toward or away from the clamp 12 varies the amount of the spring 11 which is supported in cantilever arrangement to thus adjust the amount of force required to deflect the spring 11 a given amount, thus providing an easy and convenient calibration of the device. The hose 9 is, in effect, a bleeder from the gage 8 and the reading of the gage is inversely proportional to the rate of escape of the air from the nozzle 10. The nozzle 10 fits into a slot 18 in a base 16 and is fastened adjustably to the base 16 by set screws 17. The leaf spring 11 has a hook 19 to which weights (not shown) may be secured for calibration purposes, and the spring is limited in its movement away from the nozzle 10 by an adjustment screw 20 mounted in a standard 21 secured adjustably to the base 16 in a slot 22 in the base.

When one spring 23 of a relay comb 24 held by a clamping unit 25 having jaws 26 and 27 is pressed against the spring 11, the spring 11 is deflected toward the nozzle in accordance with the strength of the spring 23 to further restrict the flow of air from the nozzle 10, the extent of which is indicated by the gage 8 which is calibrated in grams. The clamping unit 25 is mounted on a guideway 28 and is provided with a ratchet-type feed operable by a holding lever 29 and a feeding lever 30 to feed the clamping unit 25 upwardly, as viewed in Fig. 1, to move the next spring 23 into lateral alignment with a slot 31 formed in a supporting bar 32 secured to the base. A holding detent 36 is secured to the lever 29 for engaging teeth 37, and the lever 30 carries a pawl 38 therewith for advancing the unit 25 along the guideway 28.

A lever 33 carried with the unit 25 may be pivoted manually to swing a lifting bar 40 against the action of a tension spring 41 into engagement with the springs 23 to raise the springs off the bar 32 when a handle 34 is actuated along with the levers 29 and 30. Thus, the springs 23 clear the supporting bar 32 when the unit 25 is moved along the guideway 28. Compression springs 43 urge the levers 29 and 30 away from the handle or lever 34.

The bar 32 prevents engagement between all the springs 23, except the one being tested, and the spring 11 so that the force on the spring 11 from the comb 24 is due to the action of only the spring 23 being tested. The unit 25 is rapidly shifted to bring each succceding spring 23 into testing position merely by manually pressing the handle 34 and the levers 29 and 30 toward one another and releasing these elements. On the release, the next spring 23 deflects the spring 11 in accordance with the strength of that spring, and the gage 8 immediately indicates the strength of that spring, being responsive to the further closing of the nozzle 10.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A testing apparatus, which comprises a pneumatic gage including a bleeder nozzle and indicating means responsive to flow of air through the nozzle, a leaf spring, means mounting the leaf spring in a position closing the nozzle to a predetermined extent and permitting movement of the leaf spring toward the nozzle to further close it, and means for holding a spring to be tested in a position engaging the leaf spring and urging the leaf spring toward the nozzle in accordance with the strength of the spring to be tested.

2. A gaging apparatus, which comprises a holder for holding a wire spring relay comb, a pressure responsive gage positioned in lateral alignment with one spring of the wire spring relay comb for determining the tension of said spring by measuring its deflection when it is in engagement with said gage, means for moving the holder with respect to the gage to shift one spring of the comb out of lateral alignment with the gage and another spring of the comb into lateral alignment with the gage, and means for holding predetermined ones of the springs of the comb out of engagement with the gage while the tension of one spring is being measured.

3. A gaging apparatus, which comprises a pneumatic pressure responsive gage having a bleeder nozzle, a base, means mounting the nozzle on the base, a leaf spring, clamping means mounted on the base for holding the leaf spring in a position extending across the outlet of the nozzle and normally spaced a predetermined distance from the outlet of the nozzle, means for holding an article to be tested in a position pressing the portion of the leaf spring adjacent to the nozzle away from its normal spacing relative to the nozzle, means for moving the article laterally with respect to the leaf spring and for lifting the article out of engagement with the leaf spring as said article is moved laterally.

4. A gaging apparatus, which comprises a pneumatic pressure responsive gage having a bleeder nozzle, a base, means mounting the nozzle on the base, a leaf spring, clamping means mounted on the base for holding one end of the leaf spring in a position such that another portion of the spring is aligned with and normally is spaced from the outlet of the nozzle and permitting movement of the leaf spring toward the nozzle to further close the nozzle, a holder for locating a wire spring relay comb in a position in which springs of the comb extend to positions laterally aligned with the leaf spring, means mounting the holder slidable laterally with respect to the leaf spring, a supporting bar for holding predetermined ones of the springs of the comb out of engagement with the leaf spring and permitting one spring of the comb to press freely against the leaf spring, and means for lifting all the springs of the comb away from the supporting bar to permit lateral movement of the comb with respect to the leaf spring.

5. A gaging apparatus, which comprises a pneumatic pressure responsive gage having a bleeder nozzle, a base, means mounting the nozzle in an upwardly directed position on the base, a leaf spring, a pair of adjustable clamps mounted on the base for holding the leaf spring in a position aligned with the outlet of the nozzle, means for urging the leaf springs to a predetermined position spaced from the outlet of the nozzle a predetermined amount and permitting movement of the leaf spring toward the nozzle to further close the nozzle, a clamping unit for clamping a wire spring relay comb in a position in which springs of the comb extend to positions over the leaf spring, means mounting the unit slidable laterally with respect to the leaf spring, a supporting bar positioned near the leaf spring for holding predetermined ones of the springs of the comb out of engagement with the leaf spring and having a slot therein to permit one spring of the comb to press freely against the leaf spring, means for lifting all the springs of the comb away from the supporting bar to permit lateral movement of the comb with respect to the leaf spring and mounted on the unit, means for moving the unit on the base, and means for simultaneously actuating the lifting means and the moving means.

6. In a gaging apparatus for measuring the tension of springs of a wire spring relay comb by measuring the deflection thereof, a pneumatic gage including a bleeder nozzle and indicating means responsive to flow of air through the nozzle, a resilient closure member positioned a predetermined distance from the nozzle to restrict the flow of air from the nozzle, means for varying the distance from the closure member to the nozzle to adjust the indicating means, means for holding a spring of a wire spring relay comb in engagement with the resilient closure member to urge the closure member toward the nozzle to further restrict the flow of air in accordance with the deflection of the spring, and means for moving the wire spring relay comb laterally with respect to the closure member to measure the tension of each of the springs in sequence.

References Cited in the file of this patent

UNITED STATES PATENTS

| | | |
|---|---|---|
| 2,397,494 | Kuppersmith | Apr. 2, 1946 |
| 2,539,624 | Huggenberger | Jan. 30, 1951 |
| 2,573,488 | Raetsch et al. | Oct. 30, 1951 |
| 2,576,221 | Segerstad | Nov. 27, 1951 |
| 2,577,805 | Pidduck | Dec. 11, 1951 |
| 2,623,294 | Fox | Dec. 30, 1952 |

FOREIGN PATENTS

| | | |
|---|---|---|
| 873,748 | Germany | Apr. 16, 1953 |